(12) United States Patent
Martinelli

(10) Patent No.: US 6,373,734 B1
(45) Date of Patent: Apr. 16, 2002

(54) POWER FACTOR CORRECTION CONTROL CIRCUIT AND POWER SUPPLY INCLUDING SAME

(75) Inventor: Robert M. Martinelli, Temecula, CA (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/663,547

(22) Filed: Sep. 15, 2000

(51) Int. Cl.[7] ............................. H02M 5/42; G05F 1/10
(52) U.S. Cl. ........................................ 363/89; 323/222
(58) Field of Search ............................... 363/89, 80, 81, 363/84, 82; 323/222, 284, 285

(56) References Cited

U.S. PATENT DOCUMENTS

| | | | |
|---|---|---|---|
| 4,437,146 A | | 3/1984 | Carpenter |
| 4,677,366 A | | 6/1987 | Wilkinson et al. |
| 4,940,929 A | | 7/1990 | Williams |
| 5,003,454 A | * | 3/1991 | Bruning ........................ 363/81 |
| 5,006,975 A | * | 4/1991 | Neufeld ........................ 363/80 |
| 5,446,366 A | | 8/1995 | Bassett |
| 5,615,101 A | | 3/1997 | Moriarity |
| 5,638,265 A | * | 6/1997 | Gabor ........................... 363/89 |
| 5,777,866 A | | 7/1998 | Jacobs et al. |
| 6,034,513 A | | 3/2000 | Farrington et al. |

* cited by examiner

Primary Examiner—Rajnikant B. Patel
(74) Attorney, Agent, or Firm—Kirkpatrick & Lockhart LLP

(57) ABSTRACT

A power factor correction circuit for a boost power supply, wherein the boost power supply includes a boost converter responsive to a rectified AC line voltage. According to one embodiment, the power factor correction circuit includes a voltage feedback amplifier having a first input terminal responsive to an output voltage of the boost converter, a switching multiplier circuit having a first input terminal connected to an output terminal of the voltage feedback amplifier and a second input terminal responsive to the rectified AC line voltage, a current feedback amplifier having a first input terminal connected to an output terminal of the switching multiplier circuit and having a second input terminal responsive to an input current of the boost converter, and a pulse width modulator control circuit having an input terminal connected to an output terminal of the current feedback amplifier and having an output terminal for connection to a pulse width modulated switch of the boost converter.

35 Claims, 5 Drawing Sheets

POWER FACTOR CORRECTION CONTROL CIRCUIT AND POWER SUPPLY INCLUDING SAME

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to power electronics and, more particularly, to power factor correction (PFC) control circuits.

2. Description of the Background

The average power obtained from an AC line supply through an AC-to-DC power supply is always less than the product of the RMS (root mean square) voltage and the RMS current. The ratio of the average power to the product of the RMS voltage and the RMS current is known as the power factor. For example, a converter having a power factor of 70% means that the power drawn from the line supply is 70% of the product of the voltage and current in the line and, thus, only 70% of what could be obtained with a unity power factor.

To increase the power factor of a power supply, and hence the efficiency of the power supply, it is known to employ power factor correction (PFC). Indeed, PFC has become a required feature for most power supplies with an input power greater than 75 Watts. In general, PFC requires that the input current have a sinusoidal waveform and the current waveform be in phase with the input voltage waveform. Off-line switching power supplies without PFC exhibit a sharply peaked current waveform as high value input capacitors charge rapidly when the input voltage nears its maximum. Average filtering and elimination of the capacitors is ordinarily not a practical solution considering size, weight, and performance specifications.

It is known to implement PFC in a current controlled boost converter using a current feedback loop to control the input current waveform of the boost converter by continuously comparing the current to a rectified sine wave reference. The amplitude of the rectified sine wave reference may be modified to be proportional to an error signal, which is based on the DC output of the converter. It is also known to vary the amplitude of the sine wave reference with an analog multiplier circuit whereby the rectified input voltage is multiplied by the error signal. The result is that if the output voltage is above a desired value, the amplitude of the error signal and the rectified sine wave reference will decrease, and if the output voltage is below a predetermined value, the amplitude of the error signal and rectified sine wave will increase.

Typically, the variable, rectified sine wave reference is coupled to one input of an amplifier, and the other input is coupled to the rectified AC input current. The current feedback loop is arranged so that the output of the amplifier will cause the boost converter to operate in a way to force the current to follow the rectified sine wave reference. That is, if the instantaneous input current deviates from the rectified sine wave reference, the output of the amplifier drives the converter to decrease the deviation. Because the rectified sine wave reference is sinusoidal and in phase with the input voltage, the input current is also sinusoidal and in phase with the input voltage to realize PFC. Accordingly, if the load at the output increases, a resulting decrease in output voltage will cause the error signal to increase and, via the analog multiplier, cause the rectified sine wave reference to increase. This in turn will force the converter input current to increase, which will cause the output voltage to recover to the desired value.

It is also known to divide the rectified sine wave reference by the square of the RMS input voltage to improve the PFC control function. The result of dividing by the square of the RMS input voltage is to: (i) remove the unwanted increase in the rectified sine wave reference resulting from an increase in the input voltage; and (ii) effect a proportional decrease in the rectified sine wave reference required to maintain the input power constant.

Such PFC control circuits, however, are limited in their ability to precisely limit the input power because the analog multiplier is not very accurate. Consequently, the power limit may vary by as much 15% over the various input voltage conditions. To compensate for these variations, the boost converter may be over-designed to, for example, include a larger inductor or a higher-rated FET. These design modifications, however, introduce other deleterious effects, such as decreased efficiency and/or more expensive components.

Accordingly, there exists a need for a manner in which to achieve power factor correction more precisely than existing techniques, and without sacrificing overall efficiency and cost savings.

SUMMARY OF THE INVENTION

The present invention is directed to a power factor correction circuit for a boost power supply. According to one embodiment in which the boost power supply includes a boost converter responsive to a rectified AC line voltage, the power factor correction includes: a voltage feedback amplifier having a first input terminal responsive to an output voltage of the boost converter; a switching multiplier circuit having a first input terminal connected to an output terminal of the voltage feedback amplifier and a second input terminal responsive to the rectified AC line voltage; a current feedback amplifier having a first input terminal connected to an output terminal of the switching multiplier circuit and having a second input terminal responsive to an input current of the boost converter; and a pulse width modulator control circuit having an input terminal connected to an output terminal of the current feedback amplifier and having an output terminal for connection to a pulse width modulated switch of the boost converter.

According to another embodiment of the present invention, the power factor correction circuit includes: a first multiplier circuit having a first input terminal responsive to an input current of the boost converter and a second input terminal responsive to the rectified AC line voltage; a power feedback amplifier having an input terminal connected to an output terminal of the second multiplier circuit; a second multiplier circuit having a first input terminal connected to an output terminal of the power amplifier and a second input terminal responsive to the rectified AC line voltage; a current feedback amplifier having a first input terminal connected to an output terminal of the switching multiplier circuit and having a second input terminal responsive to the input current of the boost converter; and a pulse width modulator control circuit having an input terminal connected to an output terminal of the current feedback amplifier and having an output terminal for connection to a pulse width modulated switch of the boost converter.

According to another embodiment of the present invention, the power factor correction circuit includes: a voltage feedback amplifier having a first input terminal responsive to an output voltage of the boost converter; a first switching multiplier circuit having a first input terminal responsive to an input current of the boost converter and a second input terminal responsive to the rectified AC line voltage; a power feedback amplifier having an input terminal connected to an output terminal of the first switching multiplier circuit; a second switching multiplier circuit having a first input terminal connected to both an output terminal of the voltage feedback amplifier and an output terminal of the power feedback amplifier, a second input terminal responsive to the rectified AC line voltage, and an output terminal, wherein only one of the output terminal of the voltage feedback amplifier and the output terminal of the power feedback amplifier is operatively connected to the first input terminal of the switching multiplier circuit; a current feedback amplifier having a first input terminal connected to the output terminal of the second switching multiplier circuit and having a second input terminal responsive to the input current of the boost converter; and a pulse width modulator control circuit having an input terminal connected to an output terminal of the current feedback amplifier and having an output terminal for connection to a pulse width modulated switch of the boost converter.

According to another embodiment, the present invention is directed to a boost power supply including: a full-wave rectifier circuit coupled to an AC power source; a boost converter connected to the full-wave rectifier circuit for converting a rectified AC input voltage produced to a DC output voltage, the boost converter having a pulse width modulated switch; a pulse width modulator control circuit having an output terminal connected to a control terminal of the pulse width modulated switch of the boost converter; a voltage feedback amplifier having a first input terminal responsive to an output voltage of the boost converter; a first switching multiplier circuit having a first input terminal connected to an output terminal of the voltage feedback amplifier and a second input terminal responsive to the rectified AC line voltage; and a current feedback amplifier having a first input terminal connected to an output terminal of the switching multiplier circuit, a second input terminal responsive to an input current of the boost converter, and an output terminal connected to an input terminal of the pulse width modulator circuit. According to another embodiment, the power supply additionally includes a second switching multiplier circuit having a first input terminal responsive to the input current of the boost converter and a second input terminal responsive to the rectified AC line voltage, and a power feedback amplifier having an input terminal connected to an output terminal of the second multiplier circuit and an output terminal connected to the first input terminal of the first switching multiplier circuit, wherein only one of the output terminal of the voltage feedback amplifier and the output terminal of the power feedback amplifier is operatively connected to the first input terminal of the switching multiplier circuit.

The present invention provides an advantage in comparison with prior art power factor correction techniques because it is capable of more precisely limiting the input power. Using the PFC technique of the present invention, it is reasonable to expect the power limit accuracy to be on the order or +/−5%. In addition, the improved accuracy of the switching multiplier permits the use of less expensive components in the boost power supply. These and other benefits of the present invention will be evident from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a boost power supply. For example, an inrush circuit for the boost converter is not shown herein. Those of ordinary skill in the art will recognize, however, that these and other elements may be desirable in a typical boost power supply with PFC. However, because such elements are well known in the art, and because they do not facilitate a better understanding of the present invention, a discussion of such elements is not provided herein.

Figure 1:
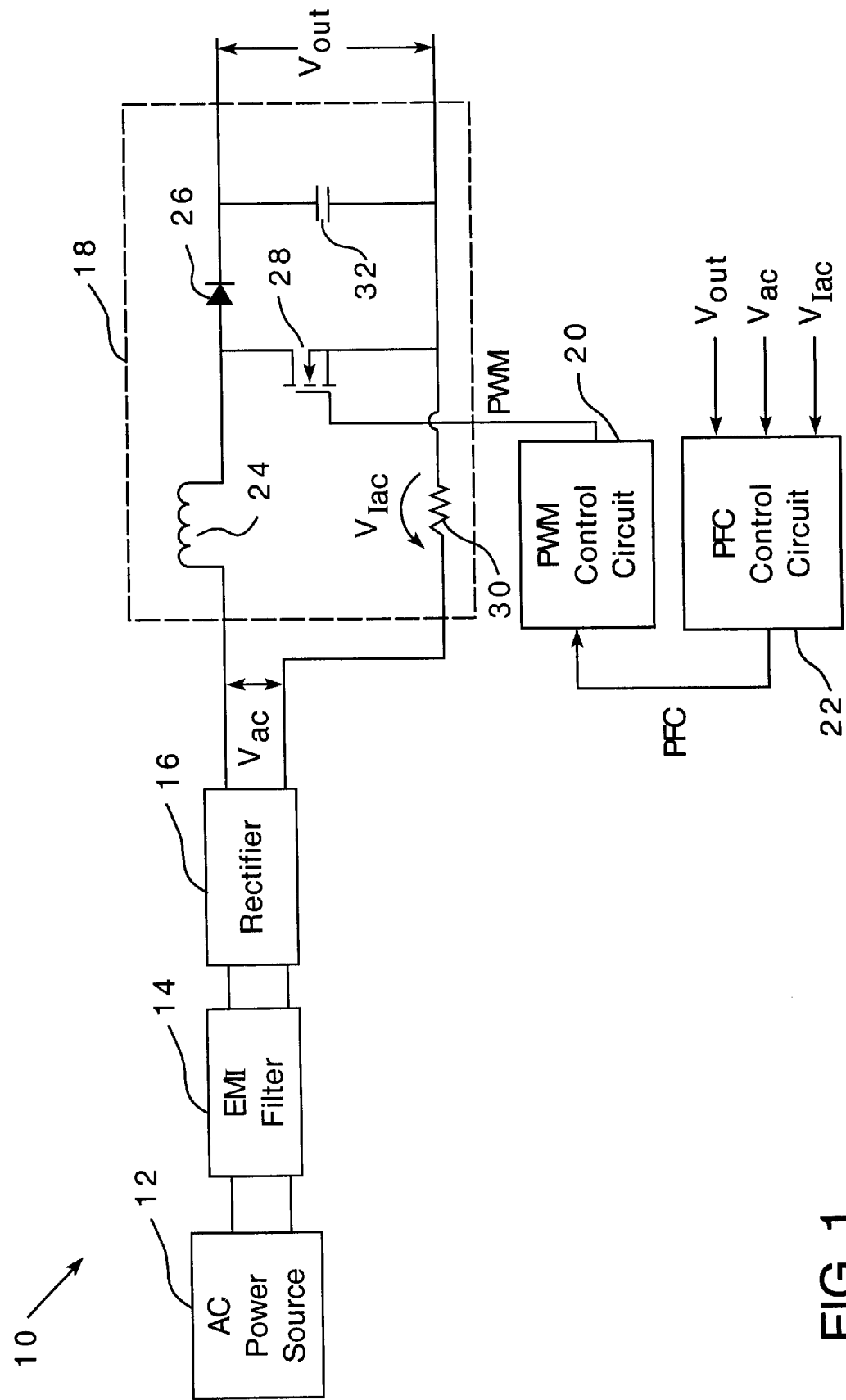
FIG. 1 is a combination block/schematic diagram of a boost power supply according to one embodiment of the present invention.

FIG. 1 is diagram of a boost power supply 10 according to one embodiment of the present invention. The power supply 10 includes an AC power source 12, an EMI filter 14, a rectifier circuit 16, a boost converter circuit 18, a pulse width modulator (PWM) control circuit 20, and a power factor correction (PFC) control circuit 22. The power supply 10 illustrated in FIG. 1 may be used to provide a regulated DC voltage output ($V_{out}$) of, for example, 400V from the AC voltage supplied by the AC power source 12.

The AC power source 12 may supply a sinusoidal voltage signal having a fundamental frequency $\omega$. The fundamental frequency $\omega$ may be, for example, 60 Hz. The EMI filter 14 may be connected between the AC power source 12 and the rectifier circuit 16, as illustrated in FIG. 1, and may filter unwanted noise. The rectifier circuit 16 may be a full-wave rectification circuit capable of converting the sinusoidal input voltage signal from the AC power source 12 to a voltage waveform in which each half cycle is positive. In FIG. 1, the fill-wave rectified input voltage is denoted as $V_{ac}$ and is referred to hereinafter as the rectified AC input voltage. According to one embodiment, the rectifier circuit 16 may include a four-diode bridge rectifier circuit.

The boost converter circuit 18 converts the rectified AC input voltage $V_{ac}$ to a DC output voltage ($V_{out}$) that may be used to power a load (not shown). The boost converter circuit 18 may include an inductor 24, a diode 26, a power switch 28, a sense resistor 30, and a capacitor 32. The inductor 24, the diode 26, and the capacitor 32 are connected in series, with the capacitor 32 connected across the output of the boost power supply 10. The power switch 28 is connected across the diode 26 and the capacitor 32 such that the duty cycle of the power switch 28 controls the voltage across the capacitor 32 (and hence the output voltage $V_{out}$). The power switch 28 may be a voltage-controlled switch such as, for example, a field effect transistor (FET), such as an n-type enhancement mode MOSFET as illustrated in FIG. 1.

In operation, when the power switch 28 is closed, current flows through the inductor 24 and the power switch 28, and the diode 26 is reversed biased. The current flowing through the inductor 24 causes energy to be stored in the inductor 24. Accordingly, when the power switch 24 is opened, the inductor 24 causes the voltage at the node between the inductor 24 and the diode 26 to increase according to the relation:

$$V = L\frac{di}{dt} \quad (1)$$

With the voltage at this node increasing, the diode 26 becomes forward-biased, and current flows through the diode 26 to the capacitor 32. After the energy stored by the inductor 24 has been transferred to the capacitor 32 through the diode 26, the power switch 28 is closed, thus again causing the diode 26 to be reversed biased and another quantity of energy to stored in the inductor 24.

In such a fashion, the duty cycle of the power switch 28 may be modulated to regulate the voltage across the capacitor 32, and hence the output voltage $V_{out}$. As described further hereinbelow, the duty cycle of the power switch 28 is controlled by the PWM control circuit 20 and the PFC control circuit 22 based on the output voltage $V_{out}$, the rectified AC input voltage $V_{ac}$, and the voltage across the sense resistor 30 ($V_{lac}$) to provide a desired output voltage with appropriate power factor correction.

The sense resistor 30 may be connected in the return loop of the boost converter 18. The voltage across the resistor 30 may used by the PFC control circuit 22, as described further hereinbelow, as a voltage signal proportional to the current of the rectified AC input line (denoted as $V_{lac}$ hereinafter). An amplifier (not shown) may be connected to the sense resistor 30 to provide the appropriate scaling for the voltage signal $V_{lac}$, as described further hereinbelow.

Figure 2:
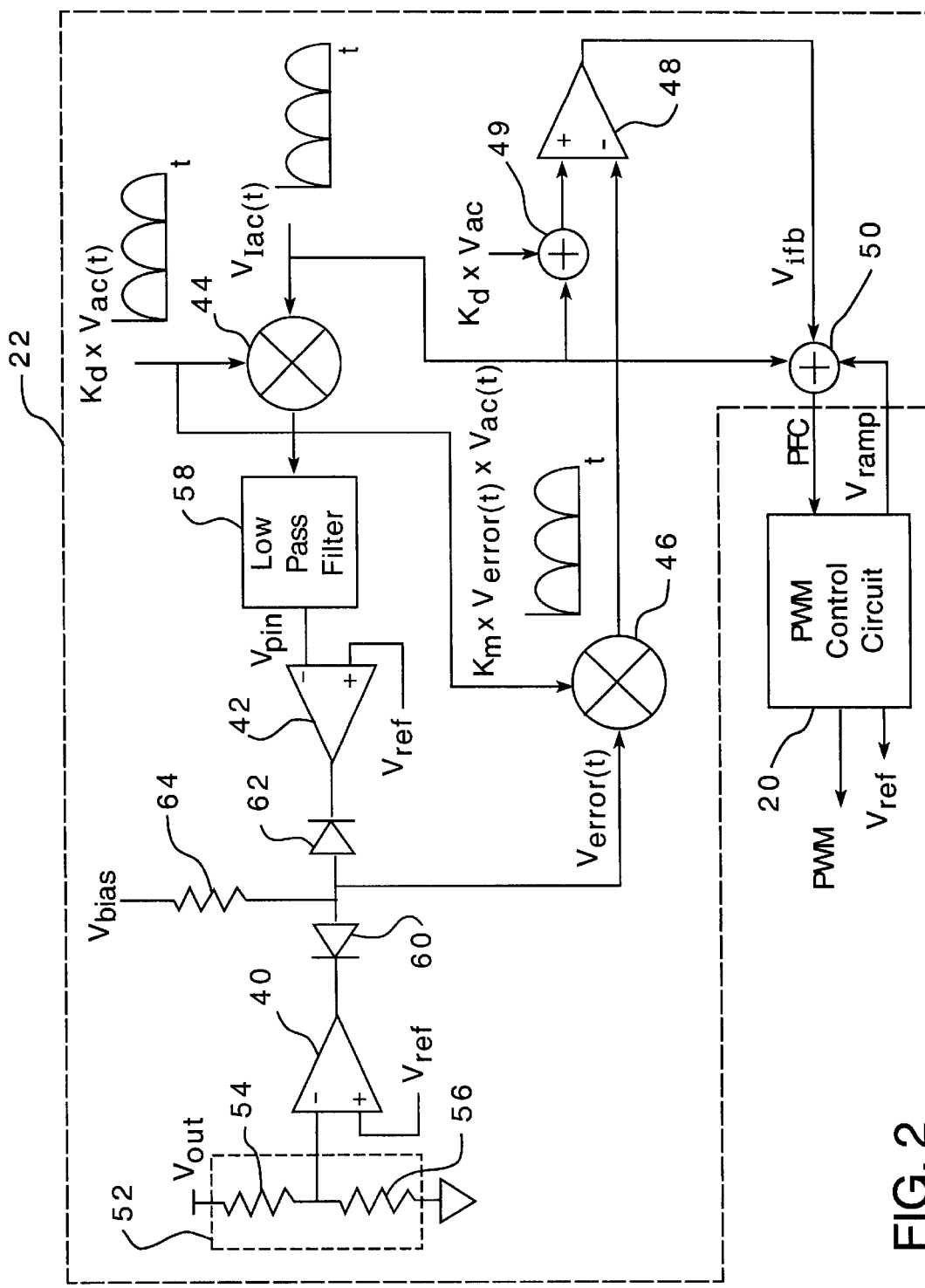
FIG. 2 is a combination block/schematic diagram of the PWM control circuit and the PFC control circuit of the boost power supply of FIG. 1 according to one embodiment of the present invention.

FIG. 2 is a diagram of the PWM control circuit 20 and PFC control circuit 22 of the power supply 10 of FIG. 1 according to one embodiment of the present invention. The PWM control circuit 20 receives an output signal PFC from the PFC control circuit 22 and, based thereon, outputs a pulse width modulated signal (PWM), which is applied to the conduction control terminal of the power switch 28 to thereby control the switching of the power switch 28 and hence the output voltage $V_{out}$ of the power supply 10. The PWM control circuit 20 also outputs a reference voltage signal $V_{ref}$ and a ramp voltage signal $V_{ramp}$, both of which are used by the PFC control circuit 22 to generate the signal PFC, as described further hereinbelow. According to one embodiment, the PWM control circuit 20 may be implemented using one of the UC 3800 series of PWM control ICs available from Texas Instruments such as, for example, a UC 3842 PWM control IC.

The PFC control circuit 22 includes a voltage feedback amplifier 40, a power feedback amplifier 42, a power multiplier 44, a current reference multiplier 46, and a current feedback amplifier 48. These components, as well as the other components of the PFC control circuit 22 described herein, may be implemented using discrete electrical components or, according to another embodiment, may be integrated into a single device or chip. Each of the amplifiers 40, 42, 48 may be embodied as, for example, integrating operational amplifiers (op-amps).

As described further hereinbelow, the current reference multiplier 46, which is discussed in more detail hereinbelow with respect to FIG. 3, receives the error voltage signal output from either the voltage feedback amplifier 40 or the power feedback amplifier 42 (denoted in FIG. 2 as $V_{error}(t)$), and multiplies that output with a scaled product of the rectified AC input voltage ($K_d \times V_{ac}(t)$) to produce a rectified sine wave reference corresponding to the product $K_m \times V_{error}(t) \times V_{ac}(t)$. The scaled rectified AC input voltage ($K_d \times V_{ac}(t)$) may be realized by connecting a resistor divider circuit (not shown) to the output of the rectifier 16 to provide the appropriate scaling. The rectified sine wave reference produced by the current reference multiplier 46 is input to an inverting input terminal of the current feedback amplifier 48 along with a current feedback signal generated by an adder 49 from the sum of (i) a voltage signal $V_{lac}(t)$ proportional to the rectified AC input current and (ii) the scaled rectified AC input voltage signal ($K_d \times V_{ac}(t)$), which is supplied to the non-inverting input terminal of the current feedback amplifier 48. The voltage signal $V_{lac}(t)$ proportional to the rectified AC input current may be obtained from the voltage across the sense resistor 30 of the boost converter 18, as described hereinbefore.

The output of the current feedback amplifier 48, denoted as $V_{ifb}$, may be summed by an adder 50 with (i) the rectified AC input current signal $V_{lac}(t)$ and (ii) the ramp voltage signal $V_{ramp}$ generated by the PWM control circuit 20, to generate the output signal PFC, which is supplied to the PWM control circuit 20 to generate the appropriate PWM signal to control the duty cycle of the power switch 28.

The voltage feedback amplifier 40 includes a first inverting input terminal responsive to the output voltage $V_{out}$ of the boost converter 18 via a resistor divider circuit 52 including a resistor 54 and a resistor 56. A second, non-inverting input terminal of the voltage feedback amplifier 40 may be responsive to the reference voltage $V_{ref}$ generated by the PWM control circuit 20. As such, the voltage feedback amplifier 40 may function as an integrating error amplifier to regulate the output voltage $V_{out}$ of the boost converter 18 to a desired level. According to one embodiment, the voltage feedback amplifier 40 may have a sufficiently low bandwidth such that the error voltage signal $V_{error}$ does not have any significant ripple at or above a certain frequency, such as $2\omega$ (e.g., 120 Hz), to minimize harmonic distortion of the input current.

The power multiplier 44, which is discussed in more detail hereinbelow with respect to FIG. 4, multiplies the scaled rectified AC input voltage ($K_d \times V_{ac}(t)$) and the rectified AC input current voltage $V_{lac}(t)$ to generate a scaled power signal waveform ($V_{pin}(t) = K_p \times P(t)$). This signal is supplied to a low pass filter 58 to attenuate certain frequency components, such as the $2\omega$ component. Thus, for example, where ω is 60 Hz, the low pass filter 58 may attenuate the 120 Hz component.

The remaining DC signal ($V_{pin}$) output from the low pass filter 58 is proportional to the average power ($P_{in}$) of the rectified AC input signal which is supplied to the boost converter 18. This signal ($V_{pin}$) is supplied to a first, inverting input terminal of the power feedback amplifier 42. A second, non-inverting input terminal of the power feedback amplifier 42 may be responsive to the reference voltage $V_{ref}$ generated by the PWM control circuit 20. Thus, the power feedback amplifier 42 may function as an integrating error amplifier having an output error signal $V_{error}$ responsive to a difference between the voltage waveform representative of the average power ($V_{pin}$) and the reference voltage $V_{ref}$.

The smaller of the instantaneous error signals $V_{error}$ generated by the voltage feedback amplifier 40 and the power feedback amplifier 42 is supplied to the current reference multiplier 46 by way of, for example, series-connected oring diodes 60, 62. Accordingly, the amplifier with the lower output controls the error feedback signal at the next stage (i.e., the current reference multiplier 46 and the current feedback amplifier 48). The anode terminals of the oring diodes 60, 62 may be coupled together as illustrated in FIG. 2, and may be biased with an appropriate bias voltage $V_{bias}$ via a resistor 64. According to another embodiment, only one of the outputs of the voltage feedback amplifier 40 and the power feedback amplifier 42 may be operatively connected to the input terminal current reference multiplier 46 by a multiplexer such as, for example, an FET multiplexer.

The current reference multiplier 46 multiplies the error voltage signal generated by either the voltage feedback amplifier 40 or the power feedback amplifier 42, as described hereinbefore, by the scaled rectified AC input voltage waveform ($K_d \times V_{ac}$). The product of this operation, as described hereinbelow, is a rectified sine wave reference corresponding to $K_m \times V_{error} \times V_{ac}$, in which the reference amplitude is controlled by the error voltage $V_{error}$. In addition, the reference waveform is in phase with the rectified AC input voltage $V_{ac}$. The output of the current reference multiplier 46, as described hereinbefore, is input to an inverting input terminal of the current feedback amplifier 48. The non-inverting input terminal of the current feedback amplifier 48 is responsive to the sum of the rectified AC input current voltage signal $V_{Iac}(t)$ waveform and the scaled rectified AC input voltage ($K_d \times V_{ac}(t)$). The output signal from the current feedback amplifier 48 is the current feedback signal $V_{ifb}$.

Figure 3:
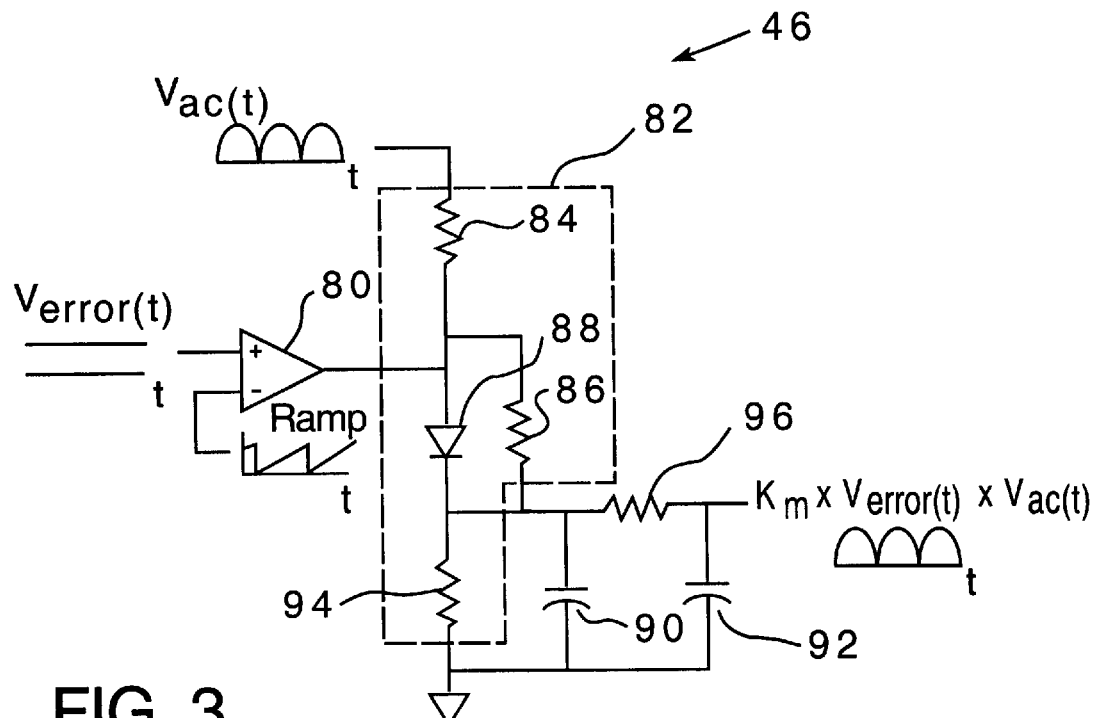
FIG. 3 is a schematic diagram of a current reference multiplier circuit of the PFC control circuit of FIG. 2 according to one embodiment of the present invention.

FIG. 3 is a diagram of the current reference multiplier 46 according to one embodiment of the present invention. According to one embodiment, the current reference multiplier 46 is a switching multiplier including a comparator 80. The rectified AC line voltage $V_{ac}$ is connected to the output terminal of the comparator 80 via a resistor divider circuit 82 including, for example, resistors 84, 86, 94 and a diode 88. The current reference multiplier 46 may also include capacitors 90, 92 and a resistor 96 connected to the output terminal of the comparator 80.

The comparator 80 includes a first input terminal responsive to the error voltage signal $V_{error}$ generated by either the voltage feedback amplifier 40 or the power feedback amplifier 42, as described hereinbefore. A second input terminal of the comparator 80 may be responsive to the ramp voltage signal $V_{ramp}$ generated by the PWM control circuit 20. The ramp voltage $V_{ramp}$ is a linear voltage function having a minimum voltage $V_{min}$, such as zero volts, and a peak voltage of $V_{pk}$. The period of the ramp voltage signal $V_{ramp}$ is $T_{sw}$.

When the instantaneous value of the error voltage signal $V_{error}$ exceeds the instantaneous value of the ramp voltage $V_{ramp}$, the output of the comparator 80 is at a high voltage value. Conversely, when the instantaneous value of the ramp voltage signal $V_{ramp}$ exceeds the instantaneous value of the error voltage $V_{error}$, the comparator 80 output voltage falls to a minimum value, such as zero volts. As the error voltage signal $V_{error}$ varies from a minimum value, such as zero volts, to the peak voltage $V_{pk}$ of the ramp voltage signal $V_{ramp}$, the time $T_{on}$ that the output of the comparator 80 is at the high voltage value during each ramp period $T_{sw}$ varies from zero to $T_{sw}$.

The resistor 86 and the diode 88 cause the charge and discharge time constants of the capacitor 90 to be equal. That is, when the output voltage of the comparator 80 is high, the capacitor 90 charges through the resistor 84 and the resistor 94 in parallel. When the output of the comparator 80 is low (e.g., zero volts), the capacitor 90 discharges through the resistor 86 and the resistor 94 in parallel. Thus, if the resistance value of the resistor 86 is chosen equal to the resistance value of the resistor 84, then both time constants are the same.

Multiplication of the error voltage signal $V_{error}$ and the rectified AC input voltage signal $V_{ac}$ by the current reference multiplier 46 is accomplished as follows. The error voltage signal $V_{error}$ is compared to the ramp voltage signal $V_{ramp}$ with the comparator 80. The pulse width at the output terminal of the comparator 80 corresponds to:

$$t_{on} = \frac{V_{error}}{V_{pk}} T_{sw} \quad (2)$$

where $T_{sw}$ is the period of the ramp waveform, as discussed hereinbefore. The duty cycle of the switching multiplier 46 may then be defined as:

$$D(t) = \frac{t_{on}}{T_{sw}} = \frac{V_{error}}{V_{pk}}. \quad (3)$$

Thus, the duty cycle of the of the comparator 80 is dependent upon the characteristics of the ramp voltage function.

The capacitor 90 causes the comparator 80 output voltage to be averaged over time. The value of the capacitor 90 may be chosen such that only the high switching frequency is averaged and not the lower line voltage frequency (i.e., 2 ω). The average voltage at the output of comparator 80 is equal to the duty cycle times the rectified AC input voltage $V_{ac}$ reduced by the resistor divider circuit 82. Thus, for an embodiment in which the resistive values of resistors 84 and 86 are equal, the output voltage of the comparator 80 corresponds to:

$$V_0(t) = D(t)\left(\frac{R_{94}}{R_{84} + R_{94}}\right)V_{ac}(t) = \frac{V_{error}(t)}{V_{pk}}\left(\frac{R_{94}}{R_{84} + R_{94}}\right)V_{ac}(t) \quad (4)$$

$$V_0(t) = \frac{1}{V_{pk}}\left(\frac{R_{94}}{R_{84} + R_{94}}\right)V_{error}(t) \cdot V_{ac}(t) = Km \cdot V_{error}(t) \cdot V_{ac}(t) \quad (5)$$

where $$Km = \left(\frac{1}{V_{pk}}\right)\left(\frac{R_{94}}{R_{84} + R_{94}}\right) \quad (6)$$

and where $R_{84}$ and $R_{94}$ are the resistive values of the resistors 84, 94 respectively.

From equation (5), it is evident that the output voltage of the comparator 80 (and hence the output voltage of the current reference multiplier 46) corresponds to the product of $V_{error}(t)$ times $V_{ac}(t)$ with a gain multiplier of $K_m$. Assuming that $V_{error}(t)$ moves slowly in comparison with $V_{ac}(t)$, then the rectified sine wave reference output of the current reference multiplier 46 is proportional to $V_{error}(t)$ and in phase with $V_{ac}(t)$.

The capacitors 90, 92 in conjunction with the resistors 84, 86, 94, 96 form a two-stage low pass filter to remove unwanted high frequency components from the rectified sine wave reference waveform. According to one embodiment, the switching frequency of the comparator 80 may be on the order of 100 kHz while the low frequency signal will be on the order of 120 Hz (i.e., 2 ω). For an embodiment where it is desirous for the current reference multiplier 46 to create a rectified sine wave reference signal that is substantially in phase with the fundamental frequency ω (e.g., 60 Hz) of the rectified AC line, the values of the components of the two-stage low pass filter may be chosen such that the filtering does not result in any significant phase shift of the rectified waveform. Accordingly, the frequency of both poles of the low pass filter may be, for example, substantially greater than ten times the fundamental frequency ω of the rectified AC line. According to one embodiment, the poles may be between 2500 Hz and 10 kHz.

Figure 4:
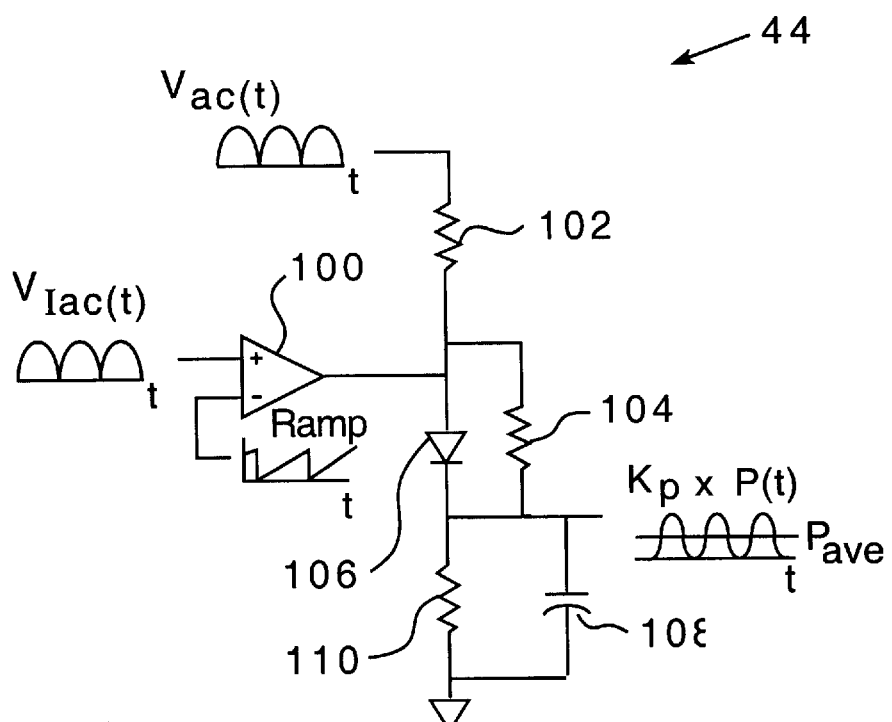
FIG. 4 is a schematic diagram of a power multiplier circuit of the PFC control circuit of FIG. 2 according to one embodiment of the present invention.

FIG. 4 is a diagram of the power multiplier 44 according to one embodiment of the present invention. The power multiplier 44 may be a switching multiplier including a comparator 100, which has a first input terminal responsive to a voltage signal $V_{lac}(t)$ that is proportional to the input current of the boost converter 18. A second input terminal of the comparator 100 may be responsive to the ramp voltage signal $V_{ramp}$ generated by the PWM control circuit 20. When the instantaneous value of the input current voltage signal $V_{lac}(t)$ exceeds the instantaneous value of the ramp voltage $V_{ramp}$, the output of the comparator 100 is at a high voltage value. Conversely, when the instantaneous value of the ramp voltage signal $V_{ramp}$ exceeds the instantaneous value of the input current voltage signal $V_{lac}$, the comparator 100 output voltage falls to a minimum value, such as zero volts. As the input current voltage signal $V_{lac}$ varies from a minimum value, such as zero volts, to the peak voltage $V_{pk}$ of the ramp voltage signal $V_{ramp}$, the time $T_{on}$ that the output of the comparator 100 is at the high voltage value during each ramp period $T_{sw}$ varies from zero to $T_{sw}$.

The rectified AC line voltage $V_{ac}$ is connected to the output terminal of the comparator 100 via a resistor divider circuit including, for example, resistors 102, 104, 110 and a diode 106. The power multiplier 44 may also include a capacitor 108 connected to the resistor divide circuit.

Similar to the current reference multiplier 46 described hereinbefore with respect to FIG. 3, the resistor 104 and the diode 106 cause the charge and discharge time constants of the capacitor 108 to be equal. That is, when the output voltage of the comparator 100 is high, the capacitor 108 charges through the resistor 102 and the resistor 110 in parallel. When the output of the comparator 100 is low (e.g., zero volts), the capacitor 108 discharges through the resistor 104 and the resistor 110 in parallel. Thus, if the resistive value of the resistor 104 is chosen equal to the resistance value of the resistor 102, then both time constants are the same.

The power multiplier 44 multiplies the input current voltage signal $V_{lac}(t)$ and the rectified AC input voltage signal $V_{ac}$. The product of these two waveforms produces a power estimation waveform which has a DC component equal to the average output power and an AC (i.e., sine wave) component that has a peak-to-peak amplitude of two times the average power. This waveform may be expressed by the following equation:

$$V_{Pin}(t) = Kp \cdot V_i(t) \cdot V_{ac}(t) = Kp \cdot V_{ip} \cdot \sin(\omega t) V_{acp} \cdot \sin(\omega t) \quad (7)$$

$$V_{Pin}(t) = Kp \cdot V_{ip} \cdot V_{acp} \cdot \sin^2(\omega t) = Kp\left(\frac{1}{2} - \cos(2\omega t)\right) \cdot V_{ip} \cdot V_{acp} \quad (8)$$

$$V_{Pin}(t) = Kp \cdot (1 - 2\cos(2\omega t)) \cdot \frac{V_{ip} \cdot V_{acp}}{2} \quad (9)$$
$$= Kp \cdot (1 - 2\cos(2\omega t)) \cdot P_{in}$$

According to one embodiment, the low pass filter 58 (see FIG. 2) may be used to attenuate, for example, the 2 ω (e.g., 120 Hz) frequency component. Thus, the remaining DC signal may be proportional to the average power ($P_{in}$). Therefore, the output of the power multiplier 44, after filtering by the low pass filter 58, may be compared to the fixed reference voltage $V_{ref}$ by the power feedback amplifier 42, as described hereinbefore, to generate an error voltage signal used by the current reference multiplier 46, as described hereinbefore, to control the average input power.

Consequently, according to the present invention, power factor correction may be realized more precisely than in comparison with prior art PFC techniques because switching multipliers (i.e., current reference multiplier 46 and power multiplier 44) are used, rather than analog multipliers. Accordingly, with the present invention, the precision of the power limit is limited only by basic component tolerances and the amplitude of the ramp voltage signal $V_{ramp}$. As such, the power limit accuracy may reasonably be on the order of 5% with the present invention.

As discussed hereinbefore, the adder 49 sums the voltage signal $V_{lac}(t)$ which is proportional to the rectified AC line current and the scaled rectified AC voltage signal $V_{ac}(t)$. The output signal of the adder 49 is input to a non-inverting input terminal of the current feedback amplifier 48, as discussed hereinbefore, thus forcing the output signal of the adder 49 to equal the rectified sine wave reference output from the current reference multiplier 46 and input to the other (inverting) input terminal of the current feedback amplifier 48. As a result, if the line voltage input to the boost converter 18 increases, the current is regulated to a lower value. By adding to the scaled rectified AC voltage signal $V_{ac}(t)$, faster response times to line voltage changes can be realized. According to another embodiment of the present invention, however, the adder 49 may be eliminated such that the scaled rectified AC voltage signal $V_{ac}(t)$ is not added to the voltage signal $V_{lac}(t)$.

Figure 5:
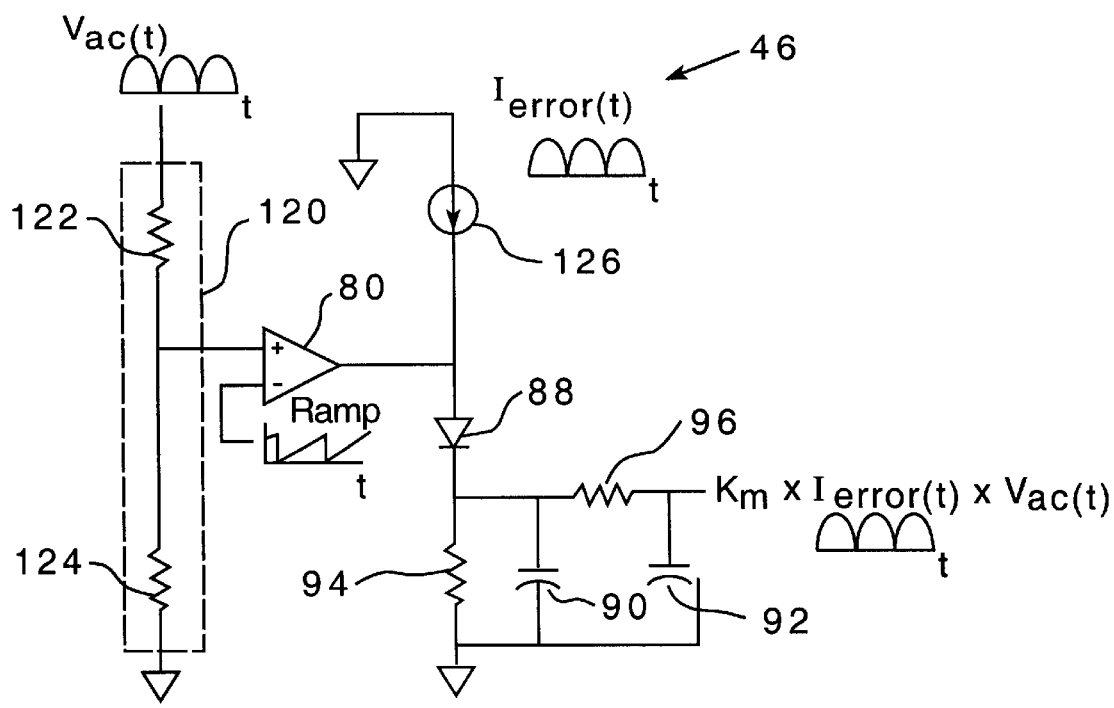
FIG. 5 is a schematic diagram of a current reference multiplier circuit of the PFC control circuit of FIG. 2 according to another embodiment of the present invention.

In the switching multipliers described hereinbefore, the multipliers 46, 40 multiply a voltage waveform times a voltage waveform. According to other embodiments of the present invention, either of these multipliers 46, 40 may be modified to multiply a voltage waveform and a current waveform. FIG. 5 is a diagram of the current reference multiplier 46 according to one such embodiment of the present invention. In the illustrated embodiment, the first terminal of the comparator 80 is responsive to the rectified AC input voltage $V_{ac}$ via a resistor divider circuit 120 comprising a resistor 122 and a resistor 124. The output terminal of the comparator 80 is coupled to an error current signal $I_{error}$ current source 126. In a manner analogous to that described hereinbefore with respect to FIG. 3, the current reference multiplier 46 may multiply the rectified AC input voltage $V_{ac}$ and the error current signal $I_{error}$ to generate the rectified sine wave reference which is proportional the error signal and in phase with the input AC line voltage.

The error signal $I_{error}$ current source 126 may be implemented using a transistor (not shown) such as, for example, a bipolar junction transistor (BJT) having its emitter terminal coupled, through a resistor (not shown), to the output of the voltage feedback amplifier 42 and the power feedback amplifier 40, its collector terminal coupled to the output terminal of the comparator 80, and its base terminal biased with a fixed voltage. Accordingly, similar to the embodiment described hereinbefore with respect to FIG. 3, the current reference multiplier 46 of FIG. 5 is responsive to the output of either the voltage feedback amplifier 42 or the power feedback amplifier 44 (via, e.g., the oring diodes 60, 62) and the rectified AC input voltage $V_{ac}$.

Figure 6:
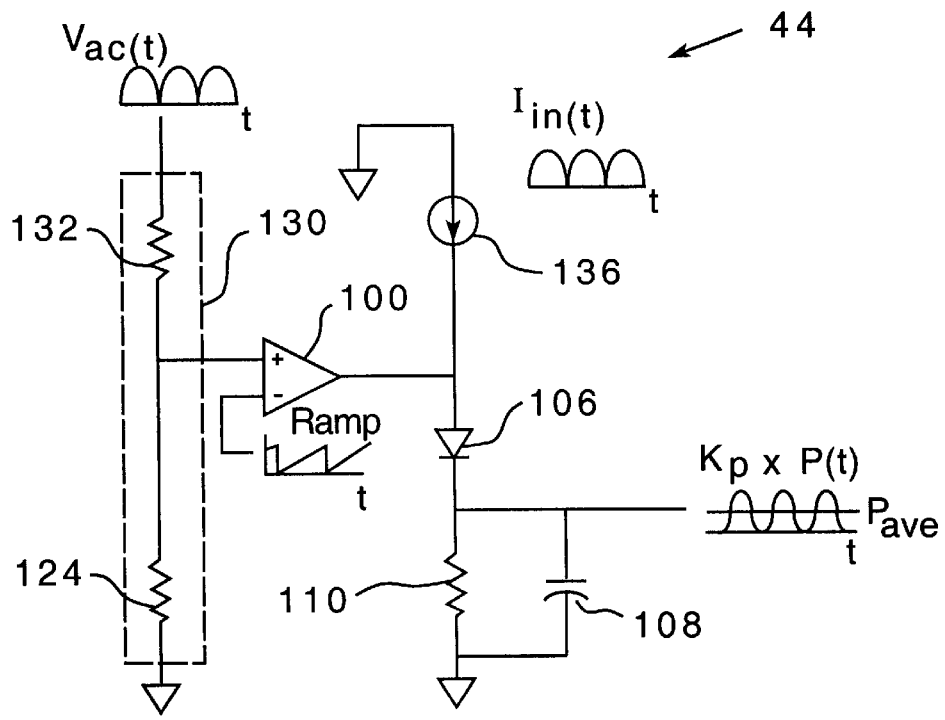
FIG. 6 is a schematic diagram of a power multiplier circuit of the PFC control circuit of FIG. 2 according to another embodiment of the present invention.

FIG. 6 is a diagram of the power multiplier 44 according to one embodiment of the present invention in which the power multiplier 44 multiplies a voltage waveform and a current waveform. In the illustrated embodiment, the first terminal of the comparator 100 is responsive to the rectified AC input voltage $V_{ac}$ via a resistor divider circuit 130 comprising a resistor 132 and a resistor 134. The output terminal of the comparator 100 is coupled to an input current signal $I_{in}$ current source 136. In a manner analogous to that described hereinbefore with respect to FIG. 4, the power multiplier 44 may multiple the rectified AC input voltage $V_{ac}$ and the input current signal $I_{in}$ to generate a waveform $(K_p \times P(t))$ that is proportional to and in phase with the input power to the boost converter 18. This waveform, as discussed hereinbefore, may be supplied to an inverting input terminal of the power feedback amplifier 42.

Figure 7:
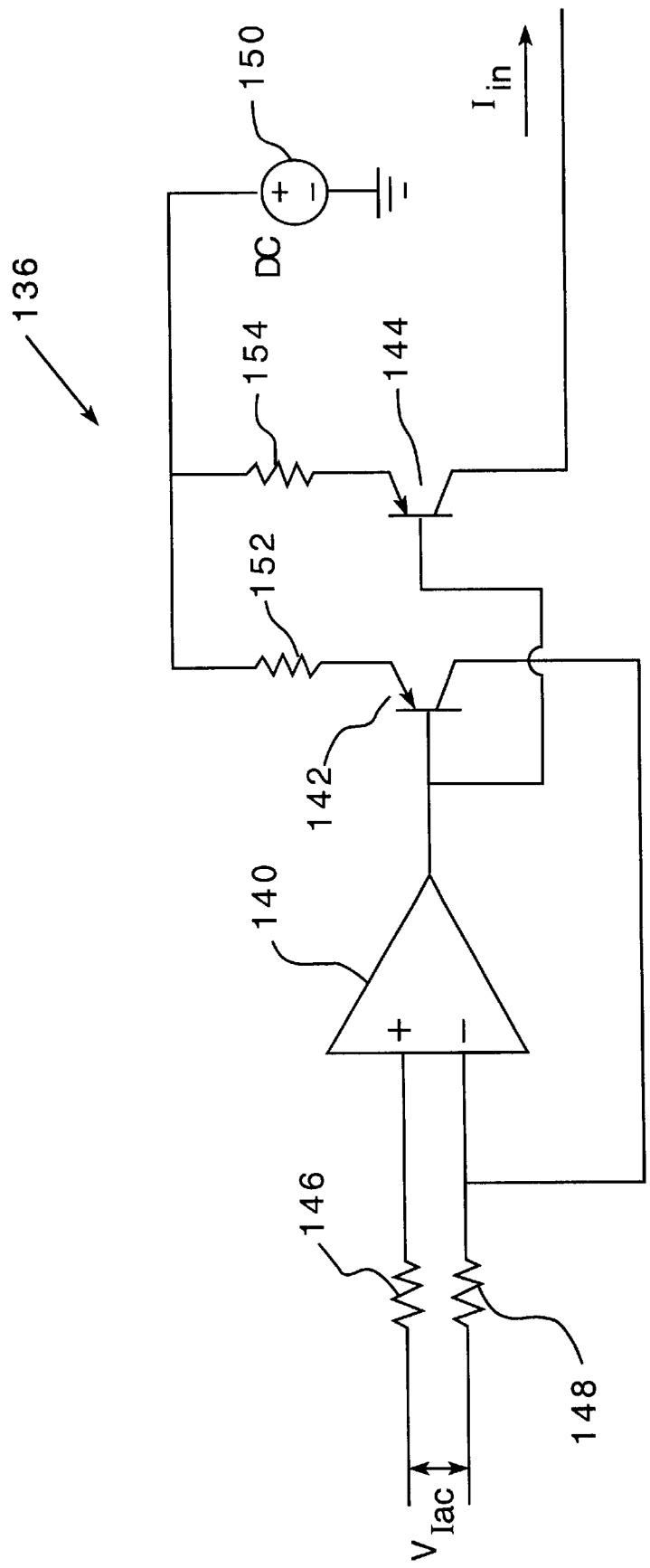
FIG. 7 is a schematic diagram of a circuit for implementing the current source of the power multiplier of FIG. 6 according to one embodiment of the present invention.

FIG. 7 is a schematic diagram of a circuit for implementing the $I_{in}$ current source 136 according to one embodiment of the present invention. The circuit 136 includes an amplifier 140 and a pair of transistors 142, 144. The transistors 142, 144 maybe, for example, bipolar junction transistors (BJTs), such as PNP transistors as illustrated in FIG. 7. The input terminals of the amplifier 140 may be responsive to the voltage across the sense resistor 30 ($V_{Iac}$) of the boost converter 18 (see FIG. 1) via resistors 146, 148 respectively.

The output terminal of the amplifier 140 may be coupled to the control terminals (e.g., base terminals) of both of the transistors 142, 144. The emitter terminals of the transistors 142, 144 may be biased by a bias voltage source 150 via resistors 152, 154 respectively. The collector terminal of the first transistor 142 may be coupled to an input terminal of the amplifier 140. According to such a configuration, the current from the collector terminal of the second transistor 144 may supply the $I_{in}$ current signal for the power multiplier 44 of FIG. 6. According to other embodiments of the present invention, the circuit 136 may be alternatively configured to supply the $I_{in}$ current signal.

Although the present invention has been described herein with respect to certain embodiments, those of ordinary skill in the art will recognize that many modifications and variations of the present invention may be implemented. For example, according to another embodiment of the present invention, the power multiplier 40 and the power feedback amplifier 42 may be eliminated from the PFC control circuit 22. In addition, according to another embodiment, the adder 50 may be eliminated from the PFC control circuit 22 such that the rectified AC input current signal $V_{Iac}(t)$ is not added to the current feedback voltage signal $V_{ifb}$ prior to being input to the PWM control circuit 20. The foregoing description and the following claims are intended to cover all such modifications and variations.

What is claimed is:

1. A power factor correction circuit for a boost power supply, wherein the boost power supply includes a boost converter responsive to a rectified AC line voltage, the power factor correction circuit comprising:
    a voltage feedback amplifier having a first input terminal responsive to an output voltage of the boost converter;
    a switching multiplier circuit having a first input terminal connected to an output terminal of the voltage feedback amplifier and a second input terminal responsive to the rectified AC line voltage;
    a current feedback amplifier having a first input terminal connected to an output terminal of the switching multiplier circuit and having a second input terminal responsive to an input current of the boost converter; and
    a pulse width modulator control circuit having an input terminal connected to an output terminal of the current feedback amplifier and having an output terminal for connection to a pulse width modulated switch of the boost converter.

2. The power factor correction circuit of claim 1, wherein the switching multiplier circuit includes a comparator.

3. The power factor correction circuit of claim 2, wherein the comparator includes a first input terminal connected to the output terminal of the voltage feedback amplifier, a second input terminal responsive to a ramp voltage signal, and an output terminal responsive to the rectified AC line voltage.

4. The power factor correction circuit of claim 2, wherein the comparator includes a first input terminal responsive to the rectified AC line voltage, a second input terminal responsive to a ramp voltage signal, and an output terminal connected to the output terminal of the voltage feedback amplifier.

5. The power factor correction circuit of claim 2, wherein the switching multiplier circuit includes a low pass filter connected to the output terminal of the comparator.

6. The power factor correction circuit of claim 5, wherein the low pass filter includes a two-stage low pass filter.

7. The power factor correction circuit of claim 1, further comprising:
    a second multiplier circuit having a first input terminal responsive to the input current of the boost converter and a second input terminal responsive to the rectified AC line voltage; and
    a power feedback amplifier having an input terminal connected to an output terminal of the second multiplier circuit and an output terminal connected to the first terminal of the switching multiplier circuit, wherein only one of the output terminal of the voltage feedback amplifier and the output terminal of the power feedback amplifier is operatively connected to the first input terminal of the switching multiplier circuit.

8. The power factor correction circuit of claim 7, further comprising means for operatively connecting only one of the output terminal of the voltage feedback amplifier and the output terminal of the power feedback amplifier to the first input terminal of the switching multiplier circuit.

9. The power factor correction circuit of claim 7, further comprising:
    a first oring diode connected between the output terminal of the voltage feedback amplifier and the first input terminal of the switching multiplier; and
    a second oring diode connected between the output terminal of the power feedback amplifier and the first input terminal of the switching multiplier.

10. The power factor correction circuit of claim 7, wherein the second multiplier circuit includes a comparator.

11. The power factor correction circuit of claim 10, wherein the comparator includes a first input terminal responsive to the input current of the boost converter, a second input terminal responsive to the ramp voltage signal, and an output terminal responsive to the rectified AC line voltage.

12. The power factor correction circuit of claim 10, wherein the comparator includes a first input terminal responsive to the rectified AC line voltage, a second input terminal responsive to the ramp voltage signal, and an output terminal responsive to the input current of the boost converter.

13. The power factor correction circuit of claim 10, further comprising a low pass filter connected between the output terminal of the comparator of the second multiplier circuit and the first input terminal of the power feedback amplifier.

14. The power factor correction circuit of claim 1, further comprising a first adder having a first input terminal responsive to the input current of the boost converter, a second input terminal responsive to the rectified AC line voltage, and an output terminal connected to the second input terminal of the current feedback amplifier.

15. The power factor correction control circuit of claim 1, further comprising a second adder having a first terminal connected to the output of the current feedback amplifier, a second input terminal responsive to the input current of the boost converter, and an output terminal for connection to the input terminal of the pulse width modulator circuit of the boost power supply.

16. The power factor correction control circuit of claim 15, wherein the second adder includes a third input terminal responsive to a ramp voltage signal.

17. A power factor correction circuit for a boost power supply, wherein the boost power supply includes a boost converter responsive to a rectified AC line voltage, the power factor correction circuit comprising:

a first multiplier circuit having a first input terminal responsive to an input current of the boost converter and a second input terminal responsive to the rectified AC line voltage;

a power feedback amplifier having an input terminal connected to an output terminal of the first multiplier circuit;

a second multiplier circuit having a first input terminal connected to an output terminal of the power feedback amplifier and a second input terminal responsive to the rectified AC line voltage;

a current feedback amplifier having a first input terminal connected to an output terminal of the second multiplier circuit and having a second input terminal responsive to the input current of the boost converter; and a pulse width modulator control circuit having an input terminal connected to an output terminal of the current feedback amplifier and having an output terminal for connection to a pulse width modulated switch of the boost converter.

18. The power factor correction circuit of claim 17, wherein the first multiplier circuit includes a first comparator having a first input terminal responsive to the input current of the boost converter, a second input terminal responsive to a ramp voltage signal, and an output terminal responsive to the rectified AC line voltage.

19. The power factor correction circuit of claim 17, wherein the first multiplier circuit includes a first comparator having first input terminal responsive to the rectified AC line voltage, a second input terminal responsive to a ramp voltage signal, and an output terminal responsive to the input current of the boost converter.

20. The power factor correction circuit of claim 17, wherein the second multiplier circuit includes a second comparator having a first input terminal connected to the output terminal of the power feedback amplifier, a second input terminal responsive to a ramp voltage signal, and an output terminal responsive to the rectified AC line voltage.

21. The power factor correction circuit of claim 17, wherein the second multiplier circuit includes a second comparator having a first input terminal responsive to the rectified AC line voltage, a second input terminal responsive to a ramp voltage signal, and an output terminal connected to the first input terminal of the current feedback amplifier.

22. The power factor correction circuit of claim 17, further comprising a first adder having a first input terminal responsive to the input current of the boost converter, a second input terminal responsive to the rectified AC line voltage, and an output terminal connected to the second input terminal of the current feedback amplifier.

23. The power factor correction control circuit of claim 17, further comprising a second adder having a first terminal connected to the output of the current feedback amplifier, a second input terminal responsive to the input current of the boost converter, and an output terminal connected to the input terminal of the pulse width modulator circuit.

24. A power factor correction circuit for a boost power supply, wherein the boost power supply includes a boost converter responsive to a rectified AC line voltage, the power factor correction circuit comprising:

a voltage feedback amplifier having a first input terminal responsive to an output voltage of the boost converter;

a first switching multiplier circuit having a first input terminal responsive to an input current of the boost converter and a second input terminal responsive to the rectified AC line voltage;

a power feedback amplifier having an input terminal connected to an output terminal of the first switching multiplier circuit;

a second switching multiplier circuit having a first input terminal connected to both an output terminal of the voltage feedback amplifier and an output terminal of the power feedback amplifier, a second input terminal responsive to the rectified AC line voltage, and an output terminal, wherein only one of the output terminal of the voltage feedback amplifier and the output terminal of the power feedback amplifier is operatively connected to the first input terminal of the switching multiplier circuit;

a current feedback amplifier having a first input terminal connected to the output terminal of the second switching multiplier circuit and having a second input terminal responsive to the input current of the boost converter; and a pulse width modulator control circuit having an input terminal connected to an output terminal of the current feedback amplifier and having an output terminal for connection to a pulse width modulated switch of the boost converter.

25. The power factor correction circuit of claim 24, further comprising means for operatively connecting only one of the output terminal of the voltage feedback amplifier and the output terminal of the power feedback amplifier to the first input terminal of the second switching multiplier circuit.

26. The power factor correction circuit of claim 24, further comprising a first adder having a first input terminal responsive to the input current of the boost converter, a second input terminal responsive to the rectified AC line voltage, and an output terminal connected to the second input terminal of the current feedback amplifier.

27. The power factor correction circuit 26, further comprising a second adder having a first terminal connected to the output of the current feedback amplifier, a second input terminal responsive to the input current of the boost converter, and an output terminal connected to the input terminal of the pulse width modulator circuit.

28. A boost power supply, comprising:
a full-wave rectifier circuit;
a boost converter connected to the full-wave rectifier circuit for converting a rectified AC input voltage produced to a DC output voltage, the boost converter having a pulse width modulated switch;
a pulse width modulator control circuit having an output terminal connected to a control terminal of the pulse width modulated switch of the boost converter;
a voltage feedback amplifier having a first input terminal responsive to an output voltage of the boost converter;
a first switching multiplier circuit having a first input terminal connected to an output terminal of the voltage feedback amplifier and a second input terminal responsive to the rectified AC line voltage; and
a current feedback amplifier having a first input terminal connected to an output terminal of the switching multiplier circuit, a second input terminal responsive to an input current of the boost converter, and an output terminal connected to an input terminal of the pulse width modulator circuit.

29. The boost power supply of claim 28, further comprising:
a second switching multiplier circuit having a first input terminal responsive to the input current of the boost converter and a second input terminal responsive to the rectified AC line voltage; and
a power feedback amplifier having an input terminal connected to an output terminal of the second multiplier circuit and an output terminal connected to the first terminal of the first switching multiplier circuit, wherein only one of the output terminal of the voltage feedback amplifier and the output terminal of the power feedback amplifier is operatively connected to the first input terminal of the first switching multiplier circuit.

30. The boost power supply of claim 29, further comprising means for operatively connecting only one of the output terminal of the voltage feedback amplifier and the output terminal of the power feedback amplifier to the first input terminal of the first switching multiplier circuit.

31. The boost power supply of claim 29, further comprising a first adder having a first input terminal responsive to the input current of the boost converter, a second input terminal responsive to the rectified AC line voltage, and an output terminal connected to the second input terminal of the current feedback amplifier.

32. The boost power supply of claim 31, further comprising a second adder having a first terminal connected to the output of the current feedback amplifier, a second input terminal responsive to the input current of the boost converter, and an output terminal connected to the input terminal of the pulse width modulator circuit.

33. A power factor correction circuit for a boost power supply, wherein the boost power supply includes a boost converter responsive to a rectified AC line voltage, the power factor correction circuit comprising:
a voltage feedback amplifier having a first terminal responsive to an output voltage of the boost converter;
first switching means for multiplying an output signal from the voltage feedback amplifier and a signal indicative of the rectified AC line voltage to produce a rectified sine wave reference signal; and
a current feedback amplifier having a first input terminal responsive to the rectified sine wave reference signal and having a second input terminal responsive to an input current of the boost converter; and
a pulse width modulator control circuit having an input terminal connected to an output terminal of the current feedback amplifier and having an output terminal for connection to a pulse width modulated switch of the boost converter.

34. The power factor correction circuit of claim 33, further comprising:
second switching means for multiplying a first signal indicative of the input current of the boost converter and a second signal indicative of the rectified AC line voltage to produce a signal indicative of input power to the boost converter; and
a power feedback amplifier having an input terminal responsive to the signal indicative of input power to the boost converter, wherein the first switching means is for multiplying only one of an output signal from the voltage feedback amplifier and an output signal from the power feedback amplifier with the signal indicative of the rectified AC line voltage to produce the rectified sine wave reference signal.

35. A power factor correction circuit for a boost power supply, wherein the boost power supply includes a boost converter responsive to a rectified AC line voltage, the power factor correction circuit comprising:
a voltage feedback amplifier having a first input terminal responsive to an output voltage of the boost converter;
a first switching multiplier circuit having a first input terminal responsive to an input current of the boost converter and a second input terminal responsive to the rectified AC line voltage;
a power feedback amplifier having an input terminal connected to an output terminal of the first switching multiplier circuit;
a second switching multiplier circuit having a first input terminal and a second input terminal, wherein the second input terminal is responsive to the rectified AC line voltage;
means for operatively connecting only one of an output terminal of the voltage feedback amplifier and an output terminal of the power feedback amplifier to the first input terminal of the second switching multiplier circuit;
a current feedback amplifier having a first input terminal connected to the output terminal of the second switching multiplier circuit and having a second input terminal responsive to the input current of the boost converter; and
a pulse width modulator control circuit having an input terminal connected to an output terminal of the current feedback amplifier and having an output terminal for connection to a pulse width modulated switch of the boost converter.

* * * * *